June 24, 1930.  A. MARTIN  1,765,686
RECEPTACLE
Filed May 14, 1929
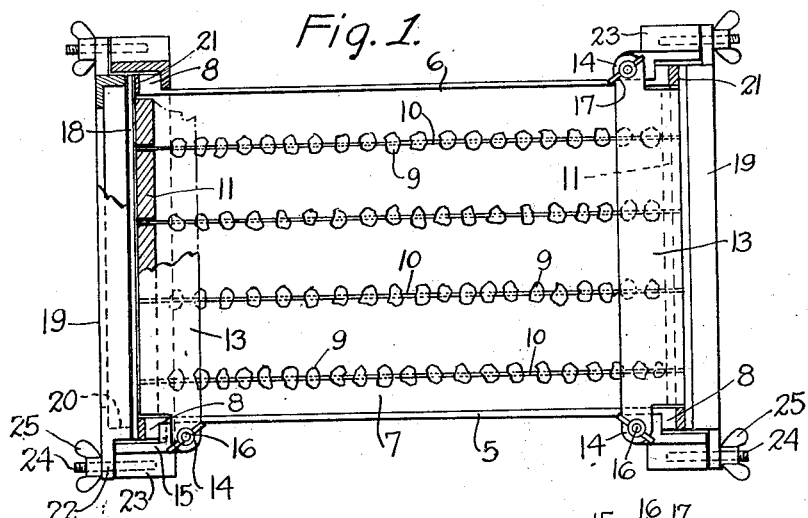
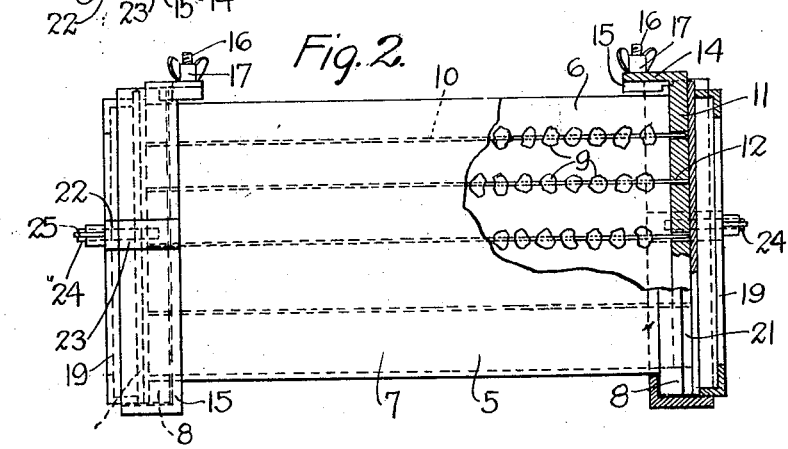
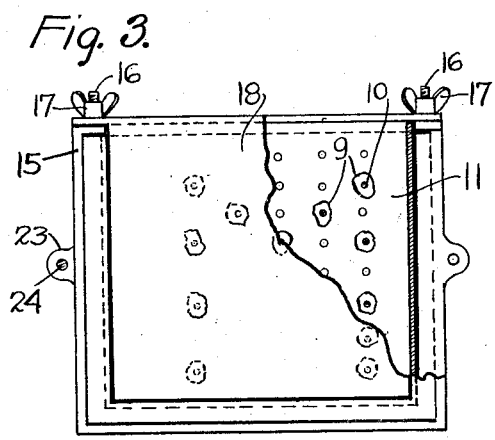
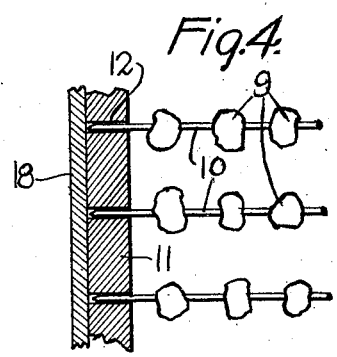
Inventor
ALBERT MARTIN
By His Attorney
John J. Lynch Patented June 24, 1930

1,765,686

UNITED STATES PATENT OFFICE

ALBERT MARTIN, OF NEW YORK, N. Y.

RECEPTACLE

Application filed May 14, 1929. Serial No. 362,955.

This invention relates to containers and in particular to one in which is incorporated means for placing a design within a foodstuff.

A particular object of my invention is to provide a knock-down baking or moulding pan, the body of which may be of any substance, such as glass, metal or the like, the ends of which may be removed, not only for the purpose of easily removing the contents of the pan after the same has been baked, frozen or otherwise prepared as a step in the completion of the foodstuff.

Heretofore I have employed a baking pan having an end in which plug openings were disposed, it being necessary to plug up these openings after pins had been passed therethrough which extended from wall to wall of the pan and were arranged to support ornamental members so that a design could be embodied in the foodstuff.

It is my intention to provide a baking pan, the end walls of which are arranged to support the ends of the ornament moulding pin, the ends of the container being closed through the medium of a liquid-proof washer and end, the ends being held in position for quick removal so that when the foodstuff is completed, the removal thereof is facilitated and the design members are left embedded in the body of the foodstuff.

With the foregoing and other objects in view, which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings:

Figure 1 is a view in top plan of a container constructed in accordance with my invention, a part thereof being shown in section to illustrate the cooperation of the various members.

Figure 2 is a view of the container illustrated in Figure 1, the view being taken in side elevation and being partly broken away to illustrate how the ornament holding pins are maintained in position in the end plates.

Figure 3 is a view in end elevation of the container illustrated in Figure 1, a part thereof being also broken away to illustrate how the ornamental members are held in position to form a design, in this instance, the letter "M," and Figure 4 is a fragmentary section enlarged of a portion of one of the end plates showing the openings therein in which the ends of the pins which carry the ornamental members are disposed.

Referring to the drawings in detail, 5 indicates a receptacle in which is arranged to be placed, the foodstuff that is to be cooked or frozen or otherwise prepared, it being understood, of course, that my invention relates particularly to the art of decorating a foodstuff, such as ice cream or cake, whose preparation is so completed that a design is left embodied in the foodstuff and extends from one end to the other thereof so that no matter where the foodstuff is sliced, the design would be shown.

My receptacle 5 consists of the side walls 6 and bottom 7, the ends thereof being outwardly flanged as at 8 and the receptacle being made from glass, metal or other suitable material. The ornamental members indicated by the numeral 9 are arranged on a series of pins 10 which extend from end to end or from side wall to side wall, whichever is the case, of the receptacle, these pins being arranged to support the ornamental members such as raisins or the like in suitable relation so that they are embedded in the body of the foodstuff when the same is completed, it of course, being the intention to withdraw the pins leaving the ornamental members so embedded.

In order that the ends of the pins may be properly supported, both ends of the receptacle 5 are closed by a pin plate 11. Inasmuch as the construction of both ends of the receptacle are identical, it is believed that the description of one end thereof will suffice, it simply being necessary to note that the pin plates 11 at opposite ends of the pan are provided with pin openings 12 in which the ends of the pins are disposed so that they are properly held in position to support the ornamental members. The end plates or pin plates fit closely into one end of the pan and each is provided with an upper, overturned portion or bridge 13, the extended ends 14 of which are arranged to be seated on the upper ends of a plate support frame 15, which fits closely about the outside of the receptacle 5 or pan to abut against the flanged portion 8 thereof. As indicated in Figure 1, the pin plate is held in position through the medium of bolts 16 and wing nut 17 so that it may be quickly removed to provide for the knock-down feature of the pan.

The receptacle may be rendered leakproof, by closing the openings in the pin plate 11 and to this end I provide an end plate 18 which is retained in position against the pin plate 11 through the medium of an end frame 19. This end frame is substantially L-shape in cross section and its inturned end 20 is arranged to engage the plate 18 at its edges and to force the same against a gasket 21 which is disposed between the flange 8 of the receptacle 5 and said end plate 18. In this way, the material in the conntainer will only get into the opening 12 and will not be able to effect an exit adjacent the end plate. Should, however, there be a slight space therebetween, the material that had passed through the openings 12 could be later removed after the end plate had been taken off.

The end frame 19 is provided with the extensions 22 at its opposite side which are secured to bosses 23 formed on the opposite side of the plate support frame 15, through the medium of bolts 24 which are arranged to receive the wing nuts 25 which hold the end frames in position not only on the plate support frames but against the end plates and it will be noted that the end plate 18 is effectively secured in position between the ends of the receptacle 5 and said end plate.

In setting up my receptacle for use, one end will be closed as illustrated in Figure 1 but the opposite end would be left open, the pins would then be put in place in one of the pin plates 11 and it is of course understood that the ornamental members would be placed on the pins before they were placed in position in said end plate. After this has been accomplished, the opposite end plate is placed over the ends of the pins 10 and it is secured to the plate support frame so that the pins 10 are not only locked in position but the plate 11 is supported. The gasket 21 is placed in position and the end plate 18 is put up against the gasket and the pin plate 11. The end frame 19 is then placed in position and the wing nuts 25 tightened to draw plate 19 against the plate support frame 15 to effectively seal the ends of the pan.

It is quite evident, therefore, that by my improved construction, I have eliminated the use of plugs about the ends of each pin which necessitated packing at the ends of the pins.

It is also evident that I have provided a pin retainer which permits loading of the pins and placing them in position and then locking them in position while at the same time closing up one end of the receptacle, means being also employed for rendering the receptacle leakproof and providing for the rapid removal of the pins after the foodstuff has been completed.

It is also evident that through my improved construction use may be made of a glass receptacle having a flanged end and the pin plate may also be made of glass and may be supported on a suitable frame piece which is easily removed from about the receptacle.

While I have illustrated and described my invention with some degree of particularity, I realize that in practice various alterations therein may be made without departing from the spirit of the invention or the scope of the appended claims.

What I claim is:—

1. A receptacle comprising a body portion, plates constituting closures disposed in the ends of the body, ornament supporting pins supported by said plates, a plurality of frames, and means for securing the frames together in plate holding relation.

2. A receptacle comprising a body portion, outwardly extending flanges formed on the ends of said body portion, plates constituting closures disposed in the ends of the body, ornament supporting pins supported by said plates, and frames engaging said flanges for holding the plates in position.

3. A receptacle comprising a body portion, plates constituting closures disposed in the opposite sides of the body, ornament supporting pins supported by said plates, a retainer on which one of the plates is supported, and a frame cooperating with the retainer for securing the plate in position.

4. A receptacle comprising a body portion, plates constituting closures disposed in the opposite sides of the body, ornament supporting pins supported by said plates, auxiliary plates abutting said pin supporting plates and means for holding all of the plates in position.

5. A receptacle comprising an open sided, flanged, body portion, a pin supporting plate constituting a closure for the receptacle, a holder for the pin plate, an auxiliary plate abutting the pin plate and means including an end frame for retaining the plates together.

6. A receptacle comprising an open sided, flanged, body portion arranged to maintain the bottom of the body portion in spaced relation with a supporting surface, a pin plate, a holder for the pin plate, an auxiliary plate abutting the pin plate, said pin plate and auxiliary plate forming a closure for the open side of the body portion secured to said pin plate holder for retaining the plates together and means for rendering the receptacle liquid-proof.

In testimony whereof I have signed my name to this specification, this 11th day of May 1929.

ALBERT MARTIN. [L. S.]